(12) United States Patent
Pathak

(10) Patent No.: US 11,027,598 B2
(45) Date of Patent: Jun. 8, 2021

(54) AUTOMOBILE VISOR EXTENDER AND USES THEREOF

(71) Applicant: Falguni Pathak, Pearland, TX (US)

(72) Inventor: Falguni Pathak, Pearland, TX (US)

(*) Notice: Subject to any disclaimer, the term of this patent is extended or adjusted under 35 U.S.C. 154(b) by 89 days.

(21) Appl. No.: 16/550,210

(22) Filed: Aug. 24, 2019

(65) Prior Publication Data

US 2021/0053425 A1 Feb. 25, 2021

(51) Int. Cl.
*B60J 3/02* (2006.01)

(52) U.S. Cl.
CPC .................. *B60J 3/0208* (2013.01)

(58) Field of Classification Search
CPC ..................................... B60J 3/0208
USPC .......................................... 296/97.6
See application file for complete search history.

(56) References Cited

U.S. PATENT DOCUMENTS

| | | | |
|---|---|---|---|
| 4,330,148 A | 5/1982 | LaMont | |
| 4,848,822 A | 7/1989 | Da Costa | |
| 5,112,096 A | 5/1992 | Keenan | |
| 5,259,657 A * | 11/1993 | Arendt | B60J 3/0208 224/312 |
| 5,379,929 A * | 1/1995 | Eskandry | B60R 7/05 224/312 |
| 5,611,590 A * | 3/1997 | Filgueiras | B60J 3/0208 296/97.1 |
| 6,176,539 B1 | 1/2001 | Westerman | |
| 6,231,108 B1 | 5/2001 | Nicol | |
| 7,344,177 B1 | 3/2008 | Glenn | |
| 7,722,109 B1 | 5/2010 | McGehee | |
| 9,073,409 B1 | 7/2015 | Damari | |
| 9,150,082 B2 | 10/2015 | Aryeh | |
| 9,669,685 B1 | 6/2017 | Yoshida | |
| 2006/0061127 A1 * | 3/2006 | Emerling | B29C 70/70 296/97.1 |
| 2014/0239665 A1 * | 8/2014 | Goodwin | B60J 3/0208 296/97.6 |

* cited by examiner

*Primary Examiner* — Joseph D. Pape
(74) *Attorney, Agent, or Firm* — Kay & Bee Intellectual Property Associates LLC

(57) ABSTRACT

Provided herein is an automobile visor extender that protects a user from light entering a vehicle cabin for a comfortable driving experience. The visor extender has a light deflector with an outer cover that encompasses a support piece in an inner core for structural support. A pair of straps are affixed on the outer cover at opposing edges to secure the visor extender to a visor in the automobile. Also described is a visor extender with a foldable inner core, which allows the user to adjust the height of the visor extender without having to stop the vehicle.

18 Claims, 6 Drawing Sheets

AUTOMOBILE VISOR EXTENDER AND USES THEREOF

BACKGROUND OF THE INVENTION

Field of the Invention

The present invention relates generally to the field of vehicle accessories. More specifically, the present invention relates to a visor extender that attaches to an automobile sun visor.

Description of the Related Art

Automobile visors shield the driver from light entering through the windshield, thereby improving visibility and comfort while driving. Visors were first introduced in vehicles as an exterior attachment to the windshield before they were moved to the vehicle interior on the ceiling above the windshield. Automobile visors have not significantly changed since their inception and while they provide protection to the driver from direct light, there is very little protection from the glare of light entering the vehicle at an angle under certain driving conditions. This results in discomfort as well as distraction for the driver leading to unsafe driving conditions. Moreover, chronic exposure to sunlight aggravates eye conditions including cataracts, pterygium, pingueculae and macular degeneration. Auto manufactures have attempted to address this by modifying the original visor to include extenders. These extenders however can be extended along only one axis and do not shield the driver under all driving conditions. This has resulted in a rapid growth of the aftermarket visor extender industry. Currently available visor extenders are bulky, require assembly and cannot be adjusted when the vehicle is in motion. Moreover, these extenders are expensive and not aesthetically pleasing to conform with the interior of vehicles.

There is therefore a recognized need in the art for cheap and aesthetically appealing automobile visor extenders that give the driver a higher range of adjustment by simple manipulations using one hand while the vehicle is in motion. The prior art is deficient in this respect. The present invention fulfils this longstanding need and desire in the art.

SUMMARY OF THE INVENTION

The present invention is directed to a visor extender. The visor extender comprises an inner core, an outer cover and a plurality of straps affixed on the outer cover. The outer cover comprises a front panel, a back panel and a plurality of edges on a perimeter of the front panel and the back panel. The front panel is affixed to the back panel at the plurality of edges to form a cavity within which is encompassed the inner core.

The present invention is also directed to an automobile visor extender. The automobile visor extender comprises a substantially rectangular light deflector and a pair of elastic straps. The light deflector comprises a removable outer cover and an inner core. The outer cover comprises a front panel, a back panel and a plurality of edges. The front panel is affixed to the back panel at all of the plurality of edges except along one edge to form an opening that is in fluid communication with a pocket formed between the front panel and the back panel. The inner core comprises an inner support piece and is configured to be removably inserted into the pocket. Each of the pair of elastic straps has a first end and a second end that are affixed at opposing edges on the outer cover.

BRIEF DESCRIPTION OF THE DRAWINGS

These and other features, aspects, and advantages of the embodiments of the present disclosure will become better understood when the following detailed description is read with reference to the accompanying drawings in which like characters represent like parts throughout the drawing, wherein:

FIG. 1A is a front view of the visor extender showing the light deflector and a pair of straps attached thereon. FIG. 1B is a front view of the visor extender with the light deflector removed showing a pair of elastic straps. FIG. 1C is a front view of the visor extender with the light deflector removed showing a pair of straps with hook and loop fasteners.

FIG. 2A is a front view of the visor extender showing an inner core partially removed from a pocket formed within a removable outer cover. FIG. 2B is a side view of the removable outer cover showing a zip fastener affixed at an opening on a side edge. FIG. 2C is a side view of the removable outer cover showing a hook and loop fastener affixed at the opening.

FIG. 4A shows an inner core comprising a plurality of slats affixed between a front support and a back support. FIG. 4B shows the inner core in FIG. 4A with the lower slats folded. FIG. 4C shows a front view of a visor extender that is partly folded due to the slats in the inner core being folded as shown in FIG. 4B.

DETAILED DESCRIPTION OF THE INVENTION

Figure 1A:
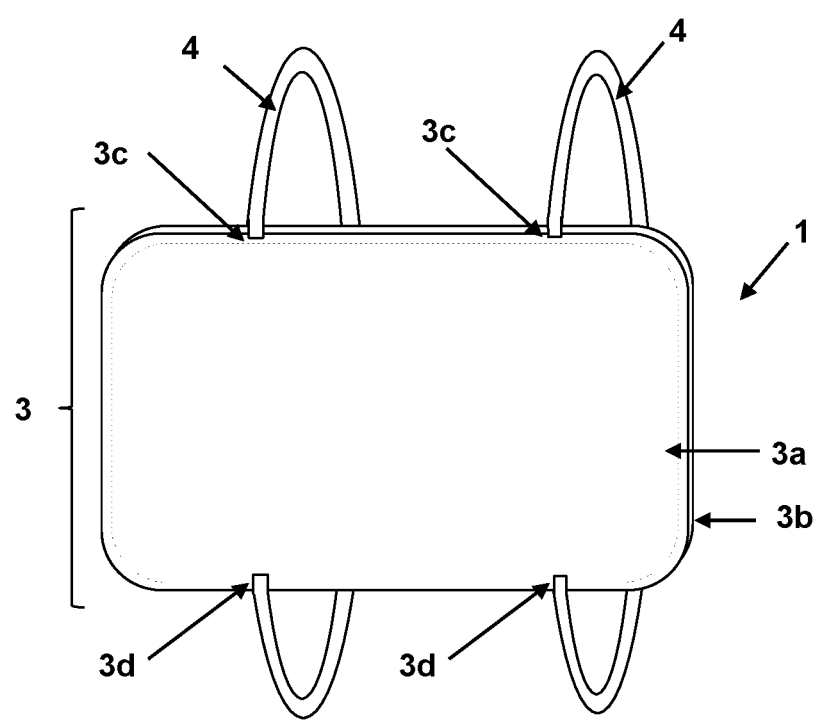
FIGS. 1A-1C show one configuration for a visor extender.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the term "slat" in singular or plural form refers to a thin, narrow piece of support made from any suitable material as described herein.

As used herein, the term "slot" is synonymous with a valley or a depression formed in between adjacent slats.

As used herein, "opposing edge" refers to mirror image locations on opposite edges of the outer cover.

As used herein, the measurement term "width" used when referring to dimensions of the claimed invention should be considered synonymous with "height" when referring to the claimed invention in use—as when attached on a vehicle visor in an automobile, where the plane of the claimed invention would be disposed perpendicular to the vehicle's ceiling.

In one embodiment of the present invention, there is provided a visor extender comprising an inner core; an outer cover comprising a front panel, a back panel and a plurality of edges on a perimeter of the front panel and the back panel, said front panel affixed to said back panel at the plurality of edges to form a cavity therewithin encompassing the inner core; and a plurality of straps affixed on the outer cover.

In this embodiment, the inner core has an overall length, width and thickness sufficiently smaller than the overall length, width and thickness of the outer cover. The inner core may have any geometric shape including, but not limited to a square shape, a rectangular shape, an octagonal shape, an ellipsoid shape and a trapezoid shape. In one aspect, the inner core is substantially rectangular. The inner core has an overall length from about 4.8 inches to about 9.8 inches, an overall width (height) from about 2.8 inches to about of 5.8 inches and an overall thickness from about 0.19 inches to about 0.45 inches. In one aspect, the inner core has a length of 7.1 inches, a width (height) of 3.1 inches and a thickness of 0.1 inches.

In this embodiment, in one aspect, the inner core comprises an inner support piece that is encompassed within the outer cover. The inner support piece is made from any material including, but not limited to a foam, a polymer, a polymer composite, a pressboard, a wood and a wood composite. A combination of these materials may also be used. Examples of such materials include, but are not limited to a polyethylene, a polyethylene terephthalate, a high-density polyethylene, a polyvinyl chloride, a low-density polyethylene, a polypropylene, a polystyrene, a fiber glass, a particle board, a fiber board, a plywood and an oriented strand board. In one aspect, the inner support piece is made from a polyethylene foam.

In another aspect of this embodiment, the inner core comprises a plurality of slats, which allow the user to adjust the height of the visor extender when attached to a visor. The plurality of slats is affixed between a front support and a back support in the inner core. In this embodiment, the slats are disposed parallel to a longitudinal axis of the visor extender and are equidistant from each other in a non-contacting relationship, thereby forming a longitudinal slot between adjacent slats. The width of the slats would depend on the incremental height adjustment desired. In this embodiment, the slats have a length equal to the length of the inner core, a width from about 0.3 inches to about 0.8 inches and a thickness from about 0.08 inches to about 0.2 inches. Also in this embodiment, the slats are disposed such that the resulting slots formed have a width from about 1.5 times to about 4 times the thickness of a slat. This allows the user to fold the visor extender along the length of the slot to a desired height that provides optimal protection of the driver's eyes from the light without obscuring vision. In this embodiment, in one aspect, the folded slats may be secured together using a commercially available clip. Alternatively, the slat is a magnetic slat with magnetic properties whereby the slats are magnetically attachable to each other when folded. Thus, the magnetic feature avoids the need for clips to removably secure the folded slats together. Moreover, the magnetic slat feature is advantageous since it allows the driver to adjust the height of the visor extender with one hand when the vehicle is in motion. In this embodiment, the magnetic slats have a length equal to the length of the inner core, a width from about 0.3 inches to about 0.8 inches and a thickness from about 0.08 inches to about 0.2 inches and may comprise any commercially available magnets including, but not limited to a permanent magnet, a rare earth magnet and a flexible magnet. One of skill in this art would be readily able to select slats with magnetic properties (for example, slats made from ferromagnetic metal) or affix magnets to non-magnetic slats for the purpose of folding the visor extender to adjust height for a comfortable, glare-free driving experience.

In this embodiment, the front support and the back support may be made from any material including, but not limited to a fabric material, a foam and an industrial fiber. A combination of these materials may also be used. Examples of such materials include, but is not limited to a plain cotton, a cotton composite, a hemp, a polyethylene foam, a quantum foam and a polyurethane foam.

Further in this embodiment, the slats may be made from any material including, but not limited to a foam, a polymer, a polymer composite, a pressboard, a wood, a wood composite, a non-magnetic metal and a ferromagnetic metal. A combination of these materials may also be used. Examples of such materials include, but are not limited to a polyethylene, a polyethylene terephthalate, a high-density polyethylene, a polyvinyl chloride, a low-density polyethylene, a polypropylene, a polystyrene, a fiber glass, a particle board, a fiber board, a plywood, an oriented strand board, an aluminium, an iron, a nickel, a cobalt and a neodymium. Also, the plurality of slats may be affixed to the front and back supports using any suitable means including, but not limited to, glue, heat, thread and a fastening tool. A combination of these affixing means may also be used.

Also in this embodiment, the outer cover functions as the light deflector in the visor extender. The outer cover has the same geometric shape as the inner core including, but not limited to a square shape, a rectangular shape, an octagonal shape, an ellipsoid shape and a trapezoid shape. The overall length, width and thickness of the outer cover is sufficiently larger than the overall length, width and thickness of the inner core so that the inner core may be encompassed within the cavity formed in the outer cover. The outer cover may have an overall length from about 5 inches to about 10 inches, an overall width (height) from about 3 inches to about of 6 inches and an overall thickness from about 0.2 inches to about 0.5 inches. In one aspect, the outer cover is substantially rectangular, having a length of 7.5 inches, a width (height) of 3.5 inches and a thickness of 0.2 inches.

In this embodiment, the front and the back panels of the outer cover are affixed to each other along the perimeter edges to form a cavity within which the inner core is encompassed. The front panel and back panel may be affixed by any suitable means including, but not limited to, glue, heat, thread, a fastening tool, or a combination of these.

In this embodiment, the front panel and the back panel of the outer cover may be made from any material including, but not limited to a fabric material, a leather, a composite fabric and a composite leather. A combination of these materials may also be used. Examples of such materials include, but are not limited to a plain cotton fabric, a polyester fabric, a silk fabric, a rayon fabric, a nylon fabric, a cellulose acetate fabric, a batiste fabric, a bombazine fabric, a brocade fabric, a buckram fabric, a calico fabric, a cambric fabric, a charmeuse fabric, a chenille fabric, a corduroy fabric, a casement fabric, a cheviot fabric, a chiffon fabric, a chino fabric, a chintz fabric, a crepe fabric, a damask fabric, a denim fabric, a dimity fabric, a drill fabric, a duck or canvas fabric, a felt fabric, a fiberglass fabric, a filter fabric, a flannel fabric, a foulard fabric, a fustian fabric, a gabardine fabric, a gauze fabric, a georgette fabric, a gingham fabric, a grey or greige fabric, a kashmir silk fabric, a khadi fabric, a khaki fabric, a lame fabric, a laminated fabric, a leno fabric, a linsey-woolsey fabric, a madras fabric, a madras muslin net fabric, a mousseline fabric, a muslin fabric, a narrow fabric, an organdy fabric, a organza fabric, an oxford fabric, a percale fabric, a poplin fabric, a quilted fabric, a reflective fabric, a satin or sateen fabric, a shantung fabric, a sheeting fabric, a taffeta fabric, a stretch fabric, a tartan fabric, a terry cloth, a ticking fabric, a tissue fabric, a velvet fabric, a voile fabric, a whipcord fabric, an industrial fabric, a faux leather, a cattle hide leather or a reptilian hide leather.

Further in this embodiment, the visor extender comprises a plurality of straps for securing the visor extender around a vehicle visor. The strap may be any type of commercially available strap that can removably secure the visor extender to the visor. In one aspect, the strap is an elastic strap with two ends that are affixed at opposing edges on the longitudinal axis (horizontal edges) of the outer cover. This arrangement allows the strap to be secured around the vehicle visor such that the back panel of the outer cover is in contact with a front surface of the vehicle visor. One of skill in this art would be readily able to procure and adapt any type of commercially available elastic strap/band and affix it to the outer cover for the purpose of securing the visor extender to a visor.

In an alternative aspect of this embodiment, the strap is a two-piece adjustable strap, which may be removably attached to each other on one end using fasteners and affixed at the other end to the opposing edges on the longitudinal axis of the outer cover. Any type of commercial strap including an elastic strap and a non-elastic strap may be used for this purpose. Also, any type of fastener may be used including, but not limited to a hook and loop fastener and a snap and press stud fastener. In either aspect of this embodiment, the straps may be affixed to the outer cover by any suitable means including, but not limited to, fabric glue, heat, thread, a fastening tool, or a combination of these. Also, in either aspect of this embodiment, the straps are affixed on the horizontal edges of the outer cover at a distance of at least 1 inch from the left and right vertical edges.

In another embodiment of the present invention, there is an automobile visor extender comprising a substantially rectangular light deflector comprising a removable outer cover comprising a front panel, a back panel and a plurality of edges, said front panel affixed to said back panel at all of said edges except along one edge to form an opening in fluid communication with a pocket formed between the front panel and the back panel; and an inner core configured to be removably inserted into the pocket; and a pair of elastic straps each with a first end and a second end, each of said first end and said second end affixed at an opposing edge on the outer cover.

In this embodiment, the light deflector has a substantially rectangular shape and comprises a removable outer cover, and an inner core. The outer cover has an overall length, width (height) and thickness sufficiently larger than the overall length, width and thickness of the inner core so that the inner core may be removably inserted into the pocket formed in the outer cover. The outer cover may have an overall length from about 5 inches to about 10 inches, an overall width (height) from about 3 inches to about of 6 inches and an overall thickness from about 0.2 inches to about 0.5 inches. In one aspect, the outer cover has a length of 7.5 inches, a width (height) of 3.5 inches and a thickness of 0.2 inches.

In this embodiment, the front and the back panels of the outer cover are affixed to each other along all the edges except along one edge. This results in a pocket formed between the front and back panels, which is in fluid communication with an opening on that non-affixed edge. The opening allows removable insertion of the inner core into the pocket, whereby a user can remove the removable outer cover for washing or, replace with a new removable outer cover for aesthetic reasons. In this embodiment, the front panel and back panel may be affixed by any suitable means including, but not limited to, glue, heat, thread, a fastening tool, or a combination of these.

Also in this embodiment, in some aspects, the automobile visor extender comprises a pair of complementarily engaging fasteners affixed at the opening formed along the one edge. Any type of fastener may be used including, but not limited to a hook and loop fastener, a zip fastener and a snap and press stud fastener. The fasteners may be affixed to the opening by any suitable means including, but not limited to, fabric glue, heat, thread, a fastening tool, or a combination of these.

Further in this embodiment, the front panel and the back panel of the outer cover are made from any material including, but not limited to a fabric material, a leather, a composite fabric and a composite leather. A combination of these materials may also be used. Examples of such materials include, but are not limited to a plain cotton fabric, a polyester fabric, a silk fabric, a rayon fabric, a nylon fabric, a cellulose acetate fabric, a batiste fabric, a bombazine fabric, a brocade fabric, a buckram fabric, a calico fabric, a cambric fabric, a charmeuse fabric, a chenille fabric, a corduroy fabric, a casement fabric, a cheviot fabric, a chiffon fabric, a chino fabric, a chintz fabric, a crepe fabric, a damask fabric, a denim fabric, a dimity fabric, a drill fabric, a duck or canvas fabric, a felt fabric, a fiberglass fabric, a filter fabric, a flannel fabric, a foulard fabric, a fustian fabric, a gabardine fabric, a gauze fabric, a georgette fabric, a gingham fabric, a grey or greige fabric, a kashmir silk fabric, a khadi fabric, a khaki fabric, a lame fabric, a laminated fabric, a leno fabric, a linsey-woolsey fabric, a madras fabric, a madras muslin net fabric, a mousseline fabric, a muslin fabric, a narrow fabric, an organdy fabric, a organza fabric, an oxford fabric, a percale fabric, a poplin fabric, a quilted fabric, a reflective fabric, a satin or sateen fabric, a shantung fabric, a sheeting fabric, a taffeta fabric, a stretch fabric, a tartan fabric, a terry cloth, a ticking fabric, a tissue fabric, a velvet fabric, a voile fabric, a whipcord fabric, an industrial fabric, a faux leather, a cattle hide leather or a reptilian hide leather.

Further in this embodiment, the inner core is substantially rectangular and has an overall length, width (height) and thickness sufficiently smaller than the overall length, width and thickness of the outer cover to allow insertion into the pocket. The inner core has an overall length from about 4.8 inches to about 9.8 inches, an overall width (height) from about 2.8 inches to about of 5.8 inches and an overall thickness from about 0.19 inches to about 0.45 inches. In one aspect, the inner core has a length of 7.1 inches, a width (height) of 3.1 inches and a thickness of 0.1 inches.

In this embodiment, in one aspect, the inner core comprises an inner support piece that may be removably inserted into the pocket in the outer cover. In this embodiment, the inner support piece may be made from any material including, but not limited to a foam, a polymer, a polymer composite, a pressboard, a wood and a wood composite. A combination of these materials may also be used. Examples of such materials include, but are not limited to a polyethylene, a polyethylene terephthalate, a high-density polyethylene, a polyvinyl chloride, a low-density polyethylene, a polypropylene, a polystyrene, a fiber glass, a particle board, a fiber board, a plywood and an oriented strand board.

In another aspect of this embodiment, the inner core comprises a plurality of slats, which allow the user to adjust the height of the visor extender when attached to a visor. The plurality of slats is affixed between a front support and a back support in the inner core. In this embodiment, the slats are disposed parallel to a longitudinal axis of the visor extender and are equidistant from each other in a non-contacting relationship, thereby forming a longitudinal slot between adjacent slats. The width of the slats would depend on the incremental height adjustment desired. In this embodiment, the slats have a length equal to the length of the inner core, a width from about 0.3 inches to about 0.8 inches and a thickness from about 0.08 inches to about 0.2 inches. Also in this embodiment, the slats are disposed such that the resulting slots formed have a width from about 1.5 times to about 4 times the thickness of a slat. This allows the user to fold the visor extender along the length of the slot to a desired height that provides optimal protection of the driver's eyes from the light without obscuring vision. In this embodiment, in one aspect, the folded slats may be secured together using a commercially available clip. Alternatively, the slat is a magnetic slat with magnetic properties whereby the slats are magnetically attachable to each other when folded. Thus, the magnetic feature avoids the need for clips to secure the folded slats together. Moreover, the magnetic slat feature is advantageous since it allows the driver to adjust the height of the visor extender with one hand when the vehicle is in motion. In this embodiment, the magnetic slats have a length equal to the length of the inner core, a width from about 0.3 inches to about 0.8 inches and a thickness from about 0.08 inches to about 0.2 inches and may comprise any commercially available magnets including, but not limited to a permanent magnet, a rare earth magnet and a flexible magnet. One of skill in this art would be readily able to select slats with magnetic properties (for example, slats made from ferromagnetic metal) or affix magnets to non-magnetic slats for the purpose of folding the visor extender to adjust height for a comfortable, glare-free driving experience.

In this embodiment, the front support and the back support may be made from any material including, but not limited to a fabric material, a foam and an industrial fiber. A combination of these materials may also be used. Examples of such materials include, but is not limited to a plain cotton, a cotton composite, a hemp, a polyethylene foam, a quantum foam and a polyurethane foam.

Further in this embodiment, the slats may be made from any material including, but not limited to a foam, a polymer, a polymer composite, a pressboard, a wood, a wood composite, a non-magnetic metal and a ferromagnetic metal. A combination of these materials may also be used. Examples of such materials include, but are not limited to a polyethylene, polyethylene terephthalate, a high-density polyethylene, a polyvinyl chloride, a low-density polyethylene, a polypropylene, a polystyrene, a fiber glass, a particle board, a fiber board, a plywood, an oriented strand board, an aluminium, an iron, a nickel, a cobalt and a neodymium. Also, the plurality of slats may be affixed to the front and back supports using any suitable means including, but not limited to, glue, heat, thread and a fastening tool. A combination of these affixing means may also be used.

Further in this embodiment, the visor extender comprises a pair of straps for securing the visor extender around a vehicle visor. The strap may be any type of commercially available strap that can removably secure the visor extender to the visor. In one aspect, the strap is an elastic strap with two ends that are affixed at opposing edges on the longitudinal axis of the outer cover. This arrangement allows the strap to be secured around the vehicle visor such that the back panel of the outer cover is in contact with a front surface of the vehicle visor. One of skill in this art would be readily able to procure and adapt any type of commercially available elastic strap/band and affix it to the outer cover for the purpose of securing the visor extender to a visor.

In an alternative aspect of this embodiment, the strap is a two-piece adjustable strap, which may be removably attached to each other on one end using fasteners and affixed at the other end to the opposing edges on the longitudinal axis of the outer cover. Any type of commercial strap including an elastic strap and a non-elastic strap may be used for this purpose. Also, any type of fastener may be used including, but not limited to a hook and loop fastener and a snap and press stud fastener. In either aspect of this embodiment, the straps may be affixed to the outer cover by any suitable means including, but not limited to, fabric glue, heat, thread, a fastening tool, or a combination of these. Also, in either aspect of this embodiment, the straps are affixed on the horizontal edges of the outer cover at a distance of at least 1 inch from the left and right vertical edges.

Described herein is an automobile visor extender comprising a light deflector and a pair of straps. The light deflector comprises an outer cover with a cavity that encompasses an inner core. The inner core comprises an inner support piece that provides structural supports to the outer cover thereby preventing it from bending, rolling or buckling. The straps may be made of an elastic material or a non-elastic material with fasteners and are affixed to the outer cover to help secure the visor extender to a visor in a vehicle. Also described is a visor extender with a foldable inner core, comprising magnetic slats, which allows the user to adjust the height of the visor extender with one hand while driving for optimal protection from light without obscuring vision. Further described is a visor extender with a removable outer cover, which gives the user an option to remove and replace with an outer cover having a different design for aesthetic purposes. Particularly, embodiments of the present invention are better illustrated with reference to the Figure (s), however, such reference is not meant to limit the present invention in any fashion. The embodiments and variations described in detail herein are to be interpreted by the appended claims and equivalents thereof.

FIG. 1A is a front view of a one configuration 1 for the visor extender. The visor extender has an outer cover 3 comprising a front panel 3a and a back panel 3b. A pair of elastic straps 4 are attached on the outer cover at opposing edges 3c and 3d.

Figure 1B:
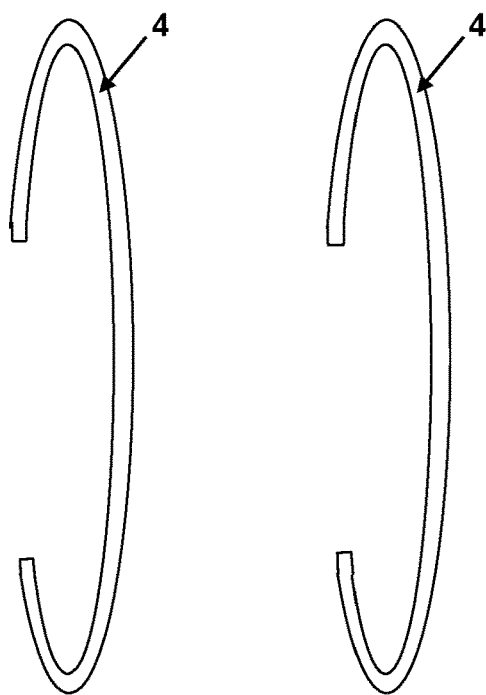

With continued reference to FIG. 1A, FIG. 1B is a front view of the visor extender with the outer cover removed to show the pair of elastic straps 4 in its entirety. The elastic straps allow removable attachment of the visor extender to a vehicle visor. The elastic straps also allow a user to adjust the visor extender using one hand while driving for a glare-free driving experience.

Figure 1C:
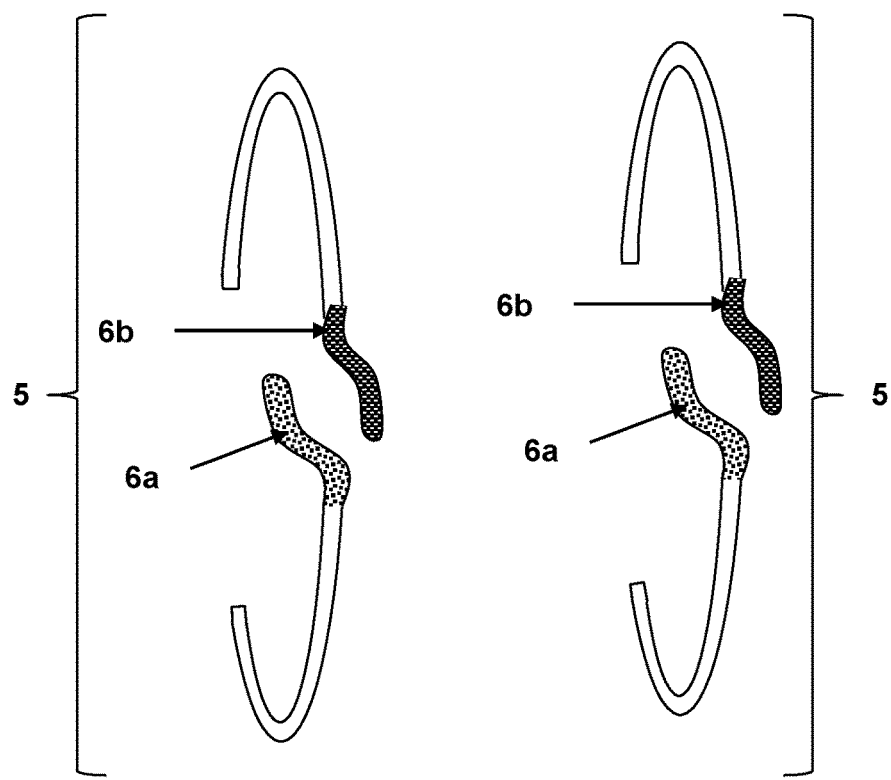

With continued reference to FIGS. 1A and 1B, FIG. 1C is a front view of the visor extender with the outer cover removed showing an alternate strap structure comprising a pair of two-piece adjustable straps 5, with hook 6a and loop 6b fasteners.

Figure 2A:
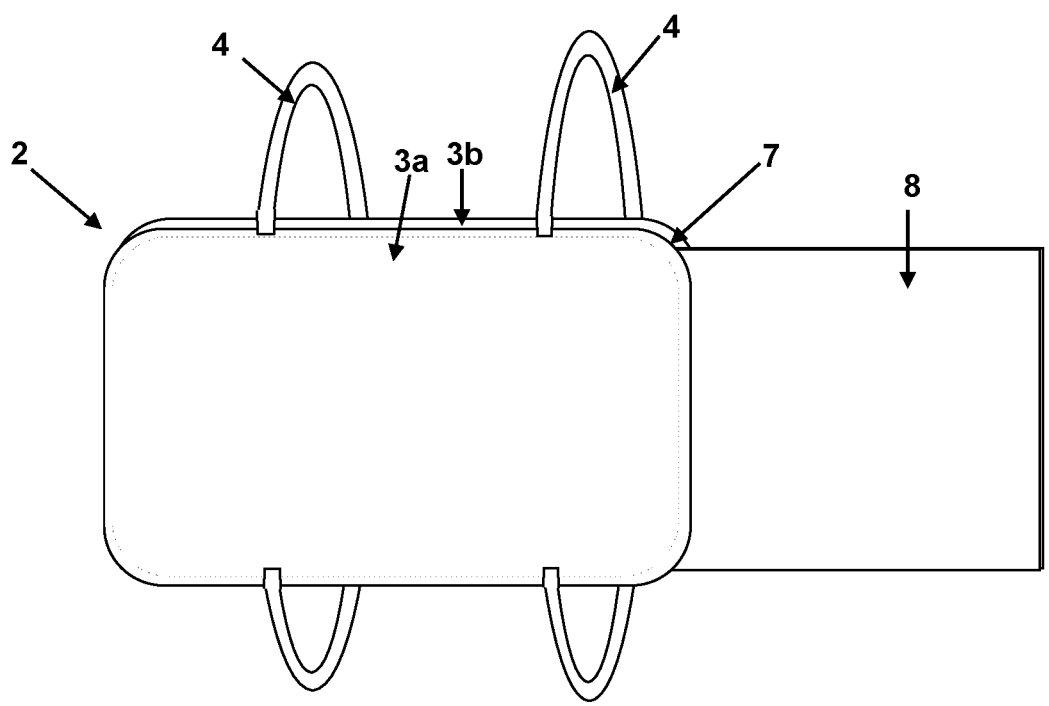
FIGS. 2A-2C show a second configuration for the visor extender.

FIG. 2A is a front view of another configuration 2 for the visor extender, which comprises a removable outer cover with the front panel 3a and the back panel 3b and the pair of straps 4 as described in FIG. 1A, but additionally with an opening 7 formed on one edge (right side edge) between the front panel and the back panel. Through this opening, an inner core comprising an inner support piece 8 may be removably inserted into a pocket formed within the removable outer cover. The removable feature allows a user to wash the outer cover and/or replace it with an aesthetically pleasing outer cover that conforms with upholstery inside the vehicle.

Figure 2B:
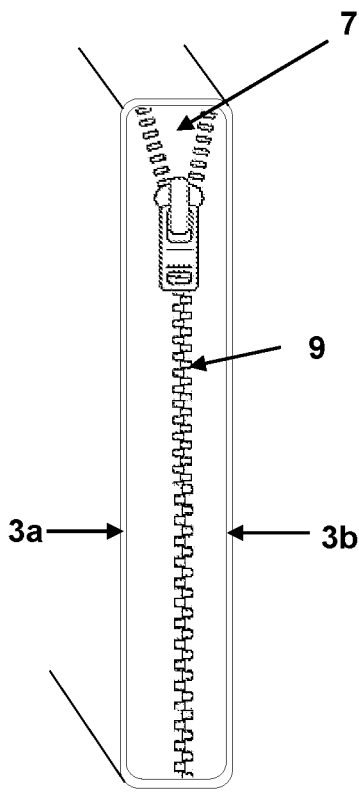

With continued reference to FIG. 2A, FIG. 2B is a magnified side view of the removable outer cover showing a zip fastener 9 affixed at the opening 7 between the front panel and the back panel.

Figure 2C:
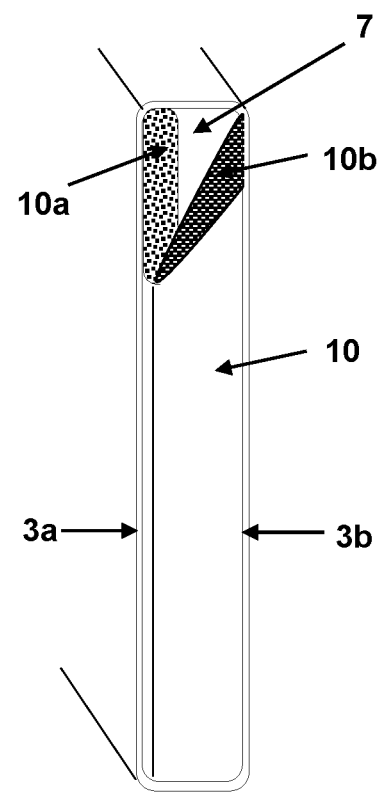

With continued reference to FIG. 2A, FIG. 2C is a magnified side view of the removable outer cover showing a hook and loop fastener 10 partially disengaged at the top to show a hook 10a and a loop 10b fasteners, which cover the opening 7.

Figure 3:
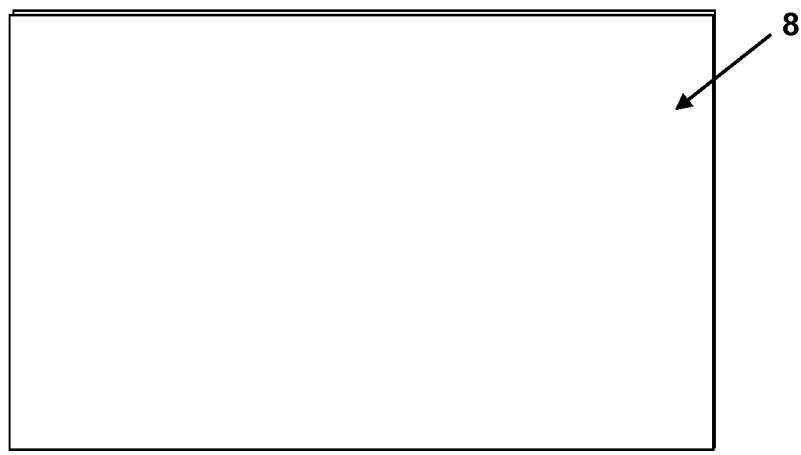
FIG. 3 is a front view of an inner core comprising an inner support piece.

With continued reference to FIG. 2A, FIG. 3 is a front view of an inner core comprising an inner support piece 8.

Figure 4A:
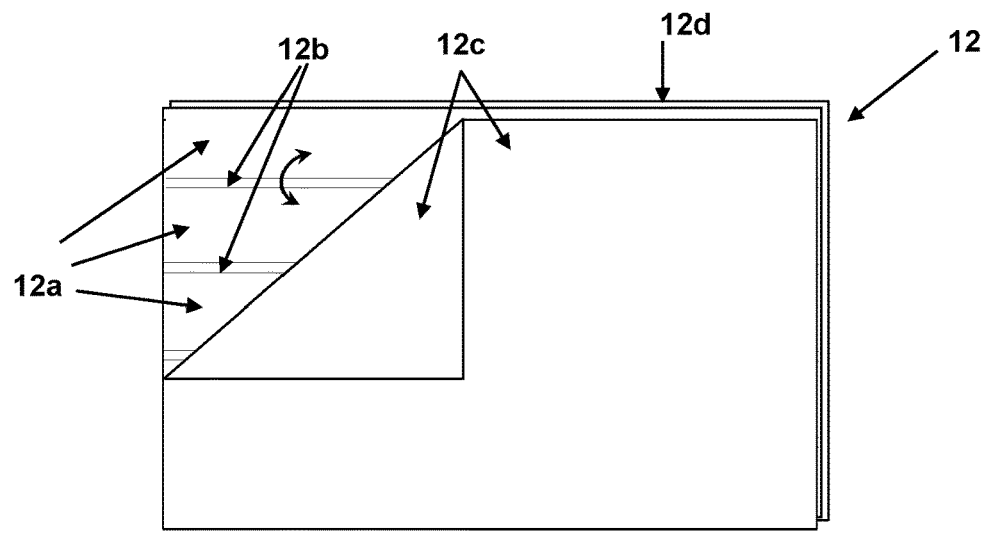
FIGS. 4A-4C show an inner core with a plurality of slats.

With continued reference to FIG. 2A and FIG. 3, FIG. FIG. 4A shows an alternate structure 12 for the inner core comprising a plurality of magnetized slats 12a affixed between a front support 12c and a back support 12d. The front support is shown partly pulled over, at the top left side of the inner core to reveal the slats 12a, which are disposed parallel to the longitudinal axis on the visor extender in a non-contacting relationship with each other, thereby forming slots 12b between adjacent slats. The magnetized slats and the slots allow the inner core to be folded.

Figure 4B:
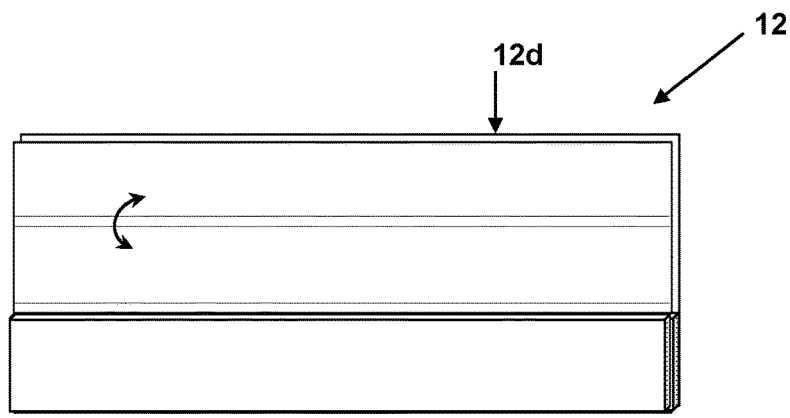
Figure 4C:
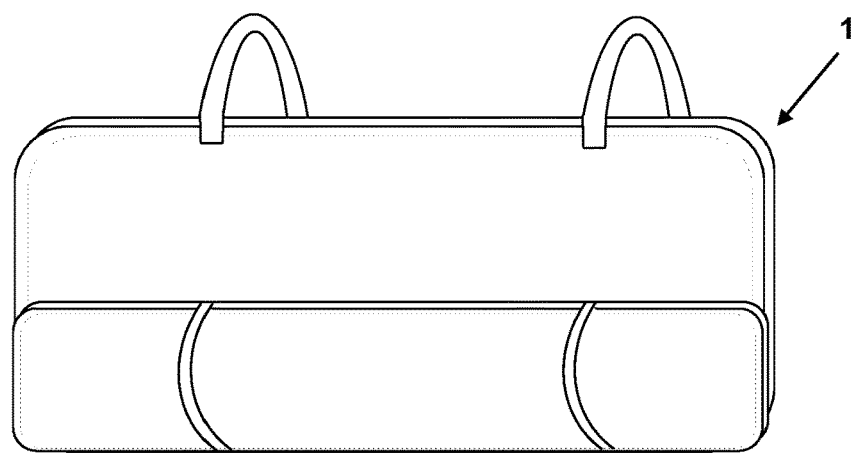

With continued reference to FIG. 4A, FIG. 4B shows the inner core with two of the magnetized slats folded, thereby reducing the width of the inner core (equivalent to the height when the visor extender is attached on a vehicle visor).

With continued reference to FIGS. 1A, 4A and 4B, FIG. 4C shows a front view of the visor extender that is partly folded due to the magnetized slats in the inner core being folded as shown in FIG. 4B.

Figure 5:
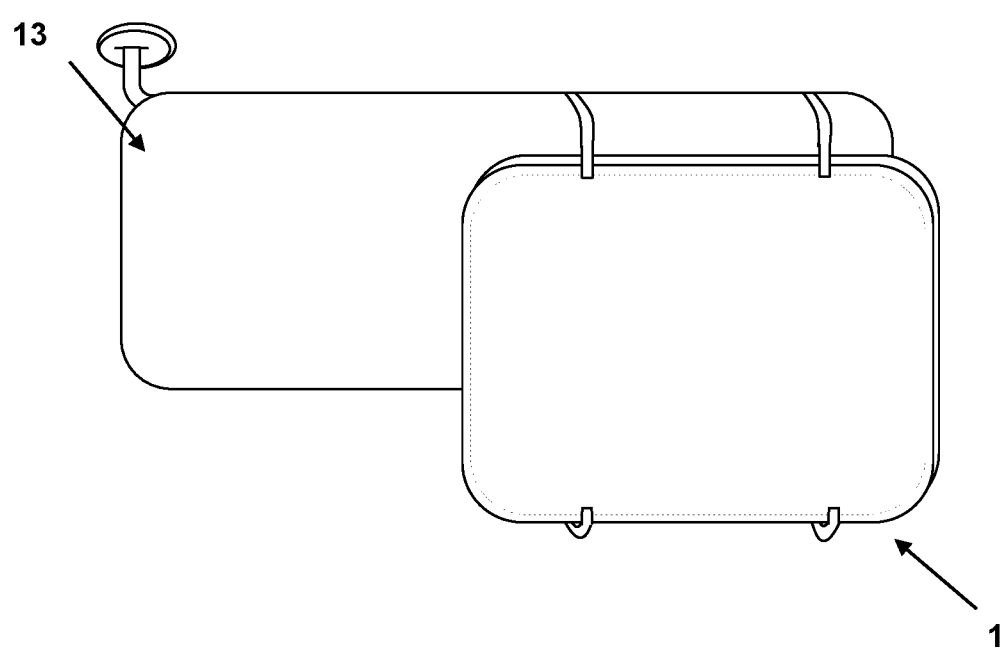
FIG. 5 shows a visor extender removably attached to an automobile visor by a pair of straps.

With reference to FIG. 1A, FIG. 5 shows the visor extender 1 removably attached to an automobile visor 13 by the pair of elastic straps. The back panel of the visor extender is contacted by a front surface of the visor when attached. The elastic straps allow the user to adjust and extend the visor extender beyond the dimensions of the visor in both the horizontal and vertical directions to obtain optimal protection from light for a comfortable driving experience.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A visor extender comprising:
   an inner core comprising a plurality of slats affixed between a front support and a back support, said slats disposed parallel to a longitudinal axis of the visor extender and in an equidistant, non-contacting relationship with each other whereby a slot is formed between adjacent slats;
   an outer cover comprising a front panel, a back panel and a plurality of edges on a perimeter of the front panel and the back panel, said front panel affixed to said back panel at the plurality of edges to form a cavity therewithin encompassing the inner core; and
   a plurality of straps affixed on the outer cover.

2. The visor extender of claim 1, wherein the inner core and the outer cover are substantially rectangular.

3. The visor extender of claim 1, wherein the inner core has a length of about 6.5 inches, a width of about 3.25 inches and a thickness of about 0.18 inches.

4. The visor extender of claim 1, wherein each of the plurality of slats is magnetized.

5. The visor extender of claim 1, wherein the front support and the back support are made from a fabric material, a foam, an industrial fiber, or a combination thereof.

6. The visor extender of claim 1, wherein each of the plurality of slats is made from a polymer, a polymer composite, a pressboard, a wood, a wood composite, a metal, or a combination thereof.

7. The visor extender of claim 1, wherein the outer cover has a length of about 7 inches a width of about 3.5 inches and a thickness of about 0.2 inches.

8. The visor extender of claim 1, wherein the front panel and the back panel of the outer cover are made from a fabric material, a leather, a composite fabric, a composite leather, or a combination thereof.

9. The visor extender of claim 1, wherein each of the plurality of straps is an elastic strap with a first end and a second end, said first end and said second end affixed at opposing edges on the outer cover.

10. The visor extender of claim 1, wherein each of the plurality of straps is adjustable and comprises two pieces having first ends affixed on the outer cover at opposing edges, and second ends affixed with complementary hook and loop fasteners.

11. An automobile visor extender comprising:
   a substantially rectangular light deflector comprising:
      a removable outer cover comprising a front panel, a back panel and a plurality of edges, said front panel affixed to said back panel at all of said edges except along one edge to form an opening in fluid communication with a pocket formed between the front panel and the back panel, said opening comprising a pair of complementarily engaging fasteners affixed thereon; and
      an inner core configured to be removably inserted into the pocket; and
   a pair of elastic straps each with a first end and a second end, each of said first end and said second end affixed at an opposing edge on the outer cover.

12. The automobile visor extender of claim 11, wherein the pair of complementarily engaging fasteners is a zip fastener or a hook and loop fastener.

13. The automobile visor extender of claim 11, wherein the outer cover has a length of 7 inches a width of 3.5 inches and a thickness of 0.2 inches.

14. The automobile visor extender of claim 11, wherein the front panel and the back panel are made from a fabric material, a leather, a composite fabric, a composite leather, or a combination thereof.

15. The visor extender of claim 11, wherein the inner core has a length of 6.5 inches a width of 3.25 inches and a thickness of 0.18 inches.

16. The automobile visor extender of claim 11, wherein the inner core comprises an inner support piece made from a foam, polymer, a polymer composite, a pressboard, a wood, a wood composite, a metal, or a combination thereof.

17. The automobile visor extender of claim 11, wherein the inner core comprises a plurality of slats affixed between a front support and a back support, said slats disposed parallel to a longitudinal axis of the visor extender and in an equidistant, non-contacting relationship with each other whereby a slot is formed between adjacent slats.

18. The visor extender of claim 17, wherein each of the plurality of slats is magnetized.

\* \* \* \* \*